Jan. 7, 1958 R. L. SARGISSON ET AL 2,819,355

DIAL MOUNTING

Filed Aug. 10, 1956 3 Sheets-Sheet 1

INVENTOR.
ROBERT L. SARGISSON
FREDRIC E. WOOD
BY

ATTY.

DIAL MOUNTING

Filed Aug. 10, 1956

*INVENTOR.*
ROBERT L. SARGISSON
FREDRIC E. WOOD
*BY* Mc Walter Owen.
ATTY.

INVENTOR.
ROBERT L. SARGISSON
FREDRIC E. WOOD
BY McWalter Owen
ATTY.

United States Patent Office 2,819,355

Patented Jan. 7, 1958

2,819,355

DIAL MOUNTING

Robert L. Sargisson, Berwyn, and Fredric E. Wood, McHenry, Ill., assignors to General Telephone Laboratories, Incorporated, a corporation of Delaware Application August 10, 1956, Serial No. 603,253

7 Claims. (Cl. 179—178)

This invention relates to telephone subsets in general and more specifically to means for mounting a dial assembly of the finger wheel type is a telephone subset.

The primary object of the present invention is the provision of means whereby the dial assembly is non-rigidly supported on a mounting bracket fixed to the subset base plate so that the dial assembly is properly positioned and resiliently seated in engagement with the cover, or housing, of the subset in the dial opening provided in the housing, thereby providing a dust proof cover for the internal mechanism of the subset. A mounting arrangement of the above type enables quick and easy assembly of the housing on the base plate as well as ready accessibility for adjustments and repairs.

A feature of the invention resides in the use of a novel bayonet mounting of the dial assembly including tensioned spring means, to properly position and seat the dial assembly within a housing opening provided therefor without the need for any screw or bolt fastening means, to thereby allow easy and fast assembly or dis-assembly of the dial assembly.

Another feature of the invention resides in the use of a tapered rim about the outer periphery of a number plate, in combination with the above stated feature, for self-aligning the number plate with the dial opening in the housing, as long as the bracket for the bayonet mounting is "floating" i. e. not fixed in position.

A further feature resides in the use of a novel bayonet mounted dial bracket, whereby, the dial and bracket can be removed in a single motion by pressing downward on the dial and at the same time pressing the dial toward the front of the telephone, and it can be replaced by setting the dial bracket on the front of the dial and mounting frame and pressing downward and towards the back of the telephone.

Other objects and features of the invention will be apparent from the following description of the drawings comprising Figures 1 to 7, which show sufficient view of the mounting arrangement constructed in accordance with the invention to enable the invention to be described and understood.

In my prior Patent No. 2,726,292, issued December 6, 1955, there is disclosed a dial mounting plate having key hole slots, and a mounting bracket having shouldered screws for movably mounting the dial mounting plate and a dial assembly to the mounting bracket. During final inspection or at any time that it is necessary to inspect the dial under this method, it is necessary to back out these two shouldered screws before the dial mounting bracket can be removed. These same screws must be retightened when the dial is replaced. In the present invention, with the novel bayonet mounted dial bracket, the dial and bracket can be removed in a single motion by pressing downward on the dial and at the same time pressing the dial toward the front of the telephone. It can be replaced by setting the dial plate on the front of the dial and mounting bracket and pressing downwards and towards the back of the telephone. The time saving is quite appreciable.

Also in contrast to my prior Patent No. 2,726,292, the addition of a tapered section to the number plate in the present invention, makes the number plate self-aligning as long as the bracket is "floating" i. e. not fixed in position as it was in the prior patent. In other words, before the housing is placed on the telephone, the dial is held approximately in position by means of the bayonet mounting dial bracket hooking over two locating pins, or studs in the side legs of the dial mounting bracket. When the housing is placed on the telephone, the flange on the number plate is pushed down by the rib around the under side of the dial opening in the housing. This pushes the bayonet mounting dial bracket free of the locating pins. The tapered portion on the rim of the dial number plate moves the dial and bayonet bracket into alignment with the dial opening in the housing. The dial is thus held in position by the springs under the bayonet mounting dial bracket forcing the dial and bracket upwards until the dial number plate flange rests against the under side of the rib around the dial opening in the housing and the tapered portion on the rim of the number plate presses against the side of the rib around the dial opening, thus preventing side motion and correctly aligning the number plate. By this means, accurate alignment of the dial with the dial opening in the housing is provided regardless of manufacturing variations in metal parts or molded shells.

Also from a practical standpoint, the combination of the tapered section on the rim of the number plate wedging against the side of the rib on the dial opening in the housing together with the flange on the number plate pressing against the bottom of the rib, provides an effective dust seal.

Figure 1:
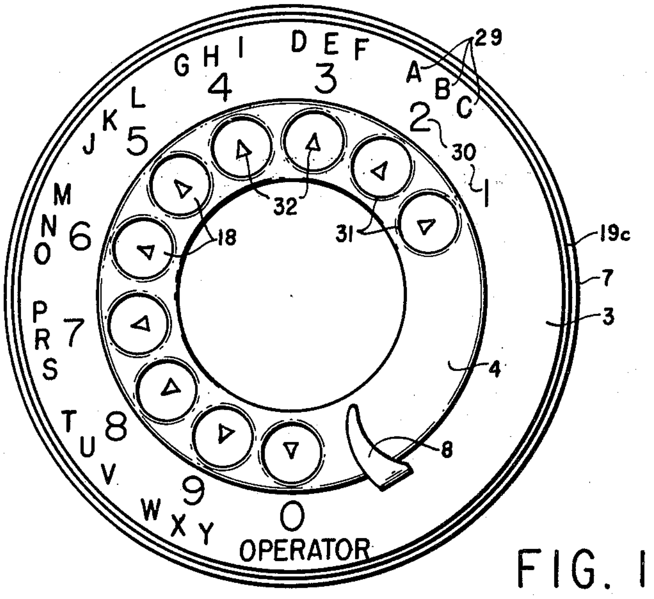
Fig. 1 shows the front view of the dial assembly comprising a dial and an extended number plate.

Fig. 1 shows the front face of the dial assembly including annular number plate 3 having a flange 7 around the periphery of the number plate 3. Numbers and letters, such as 30 and 29 respectively, are arranged in concentric circles on the face of the number plate 3. The dial comprises a finger wheel 4 rotatably mounted on the circular dial casing 18, which is positioned within the number plate 3 by an eccentric positioning arrangement to be subsequently described. The finger wheel 4 has ten concentric finger holes 31 arranged on its face, and a finger stop 8 is mounted on the dial casing 18. Arrows 32 on the cover plate directly below each finger hole point in the direction of the number and letters, such as 30 and 29 respectively, which correspond to that particular finger hole.

Figure 2:
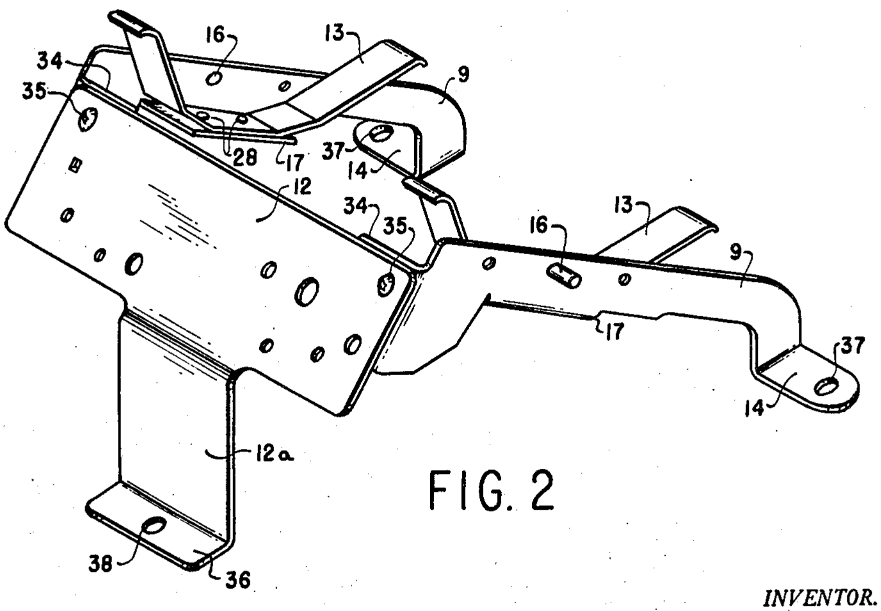
Fig. 2 shows a perspective view of the dial mounting bracket assembly.
Figure 7:
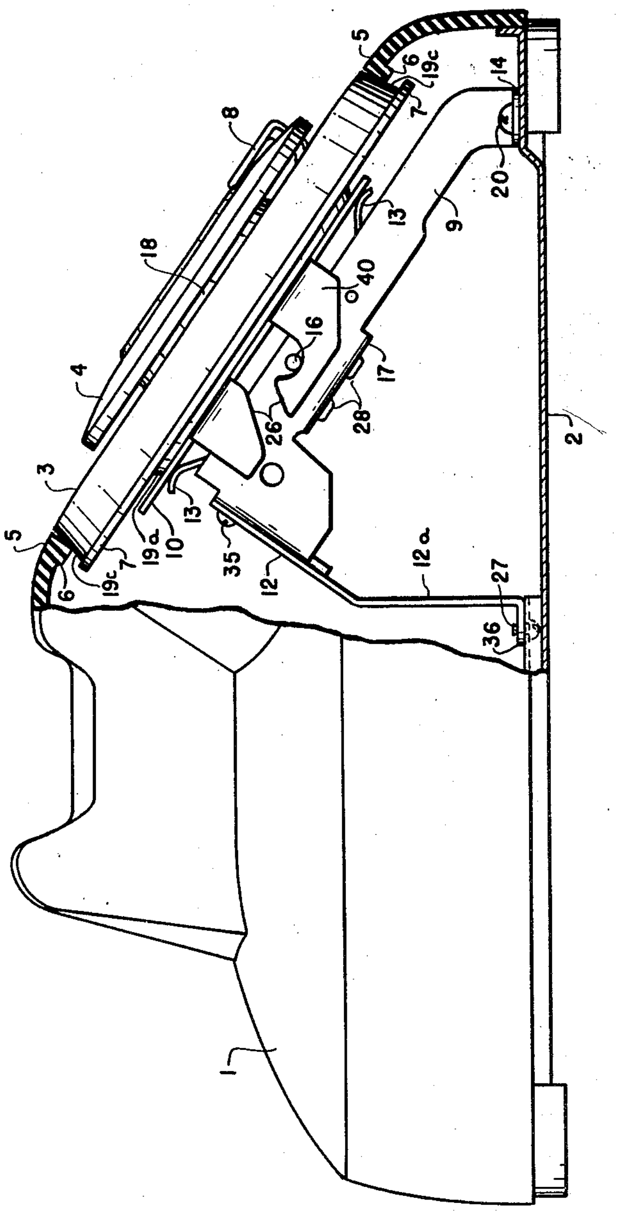
Fig. 7 shows the dial assembly mounted on the base of the telephone subset and positioned against the subset housing, part of which is shown in section.

Referring now to Fig. 2, the dial mounting bracket assembly comprises two mounting brackets 9 in the shape of legs connected to a bracket plate 12 at elbows 34 by means of the screws 35. Mounting brackets 9 have horizontal projections 14, or ears, with mounting holes 37 at their lower ends. Holes 37 are for screws 20 for mounting brackets 9 to the base plate 2 as shown in Fig. 7. Likewise, bracket plate 12 has a center leg **12*a* with a leg projection 36 including a threaded hole 38 for a screw 27 to mount the bracket plate 12 to the base plate 2 as shown in Fig. 7. Each mounting bracket 9 also includes a mounting bracket extension 17 turned inwardly at right angles to the main portion of bracket 9. Bow springs 13 are fastened to the extension 17 by means of rivets 28. Plate mounting brackets 9 also have studs 16** fastened thereto, for a purpose to be described in the ensuing description.

Figure 3:
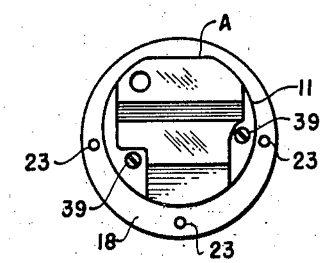
Fig. 3 shows a rear view of the dial casing.
Figure 4:
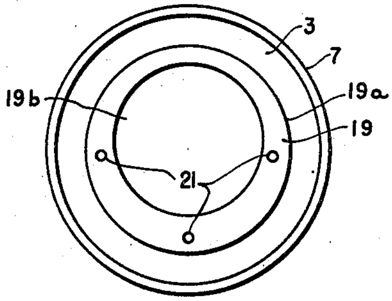
Fig. 4 shows a rear view of the annular number plate.
Figure 5:
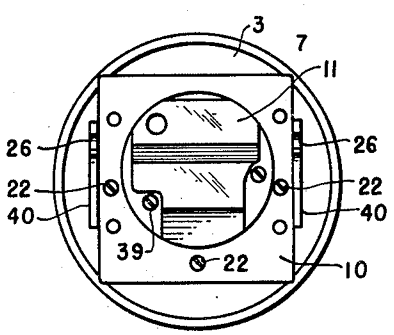
Fig. 5 shows a rear view of the dial and number plate assembled together on the mounting plate.

Figs. 3, 4, and 5 show rear views of different parts of the dial assembly. Circular dial casing 18 (Fig. 3) has three threaded holes 23. A dust cover 11, covering the dialling equipment (not shown) is mounted eccentrically in comparison with the periphery of the dial casing 18, by means of two long screws 39 extending through the dust cover 11 and into the threaded holes of the dial casing 18. Dial dust cover 11 is circular except for the surface A.

Figure 6:
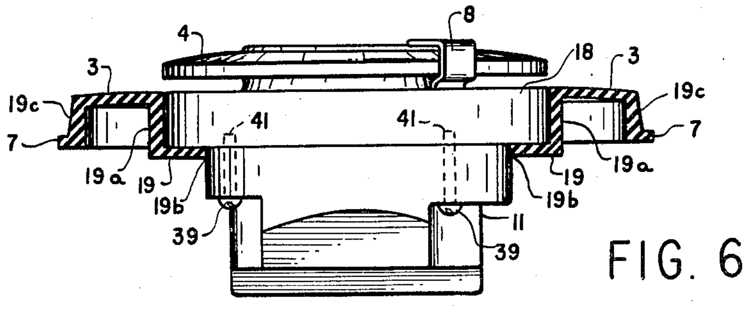
Fig. 6 shows a side view of the dial with its dust cover and with the annular number plate in section.

The annular number plate 3, has a U-shape cross section, as shown in Fig. 6, with an outer annular flange 7 about its periphery, and an inner flange 19 having an opening **19*b* as shown in Fig. 4. Annular rim 19*a* is concentric with the outer periphery of number plate 3 and flange 7, and an inner circular opening 19*b* of inner flange 19 is eccentric with the rim 19*a*, number plate 3 and flange 7. Rim 19*a* has a slightly larger circumference than the periphery of the dial casing 18, and the inner opening 19*b* has a slightly larger circumference than the outer periphery of the dial dust cover 11. Outer rim 19*c* is slightly tapered and in the shape of a truncated cone, to allow for tolerances in manufacturing, and to ensure a tight fit when rim 19*c* engages the flange adjacent the dial opening of the housing, to be described in the ensuing description. The dial casing 18 can only be placed on the inner flange 19 in a predetermined position due to the eccentric mounting of dust cover 11 on casing 18 and the eccentric opening 19*b* of flange 19. In this predetermined positioning of the casing 18 with the number plate 3, the holes 21 and flange 19 are approximately lined up with the threaded holes 23 and the casing, and the respective finger holes 31 of the finger wheel 4 are properly positioned with their corresponding indicia on the face of the number plate 3**.

A rectangular dial plate 10 (Fig. 5) has an opening corresponding to and slightly larger than the circumference of the dust cover 11. Screws 22 extend through holes in plate 10 and through holes 21 of flange 19 and into threaded holes 23 of casing 18, for completing the dial assembly.

Angular projection 40 on dial plate 10 is provided with bayonet slots 26 for movably securing the dial assembly to the dial mounting bracket, shown in Fig. 2.

Referring now to Fig. 6, there is shown a side view of the dial assembly with the number plate 3 shown in section. This view more clearly shows the contour lines of the dial dust cover 11 and the manner in which it is attached to the dial casing 18 by the long screws 39 screwed into threaded holes 41 of dial casing 18. The cross section of annular number plate 3 is substantially U-shaped and comprises an outer flange 7 on the periphery of the number plate 3, and inner rim **19*a* projecting downward from the face of the number plate 3, and outer tapered rim 19*c*, and an inner flange 19 at the lower edge of the rim 19*a* on which the casing 18 rests. Flange 19 has an opening 19*b* through which the dust cover 11 extends. The height of the dial casing 18 is substantially the same height as rim 19*a* from the face of the number plate 3 to the face of the flange 19. The periphery of the dial casing 18 is slightly smaller than the inner circumference of the rim 19*a*, and the dust cover 11 has a periphery slightly smaller than the circumference of the opening 19*b*, and thereby when the number plate 3 and the dial casing 18 are joined together as shown in the drawing, the face of the number plate 3 and the face of the dial casing 18 will be flush, and the rim 19*a* and the opening 19*b* will encircle the casing 18 and dust cover 11** respectively.

Fig. 7 shows a cut away portion of the housing 1 to show the manner in which the dial assembly is attached to the plate mounting brackets 9 and the manner in which the dial assembly is resiliently held in engagement with the housing 1 by the bow springs 13. Dial plate 10 has a pair of downwardly extending projections 40 having bayonet slots 26 cut out. (One of the slots 26 is shown in Fig. 7.) Each bayonet slot 26 has an opening provided for accepting the studs 16 fastened to legs 9, a groove where the stud 16 is engaged, and a hump to prevent extensive movement of the dial plate 10 when the stud 16 engages within the mentioned groove.

Having given a general description of the telephone subset, a more detailed description of the invention will now be given.

The dial assembly comprising number plate 3, the dial 18 with its dust cover 11, and the dial plate 10 are first assembled as a unit. The dust cover 11 is first mounted on casing 18 by means of screws 39 being screwed into threaded holes 41 in casing 18. The casing 18, with its attached dust cover 11, is inserted into the concentric opening formed by the inner rim **19*a* of number plate 3 with the dust cover 11 extending through the eccentric opening 19*b* of the number plate 3. When the casing 18 is properly positioned within the number plate 3 the rear surface of casing 18 will be seated in flange 19. Since the dust cover 11 is eccentrically mounted on the circular casing 18 and the dust cover 11 protrudes through the eccentric circular opening 19*b* of the number plate 3, it is impossible to mount the dial casing 18 within the number plate 3 in any position other than approximately aligning the holes 21 of number plate 3 with the threaded holes 23 in casing 11. When mounted in this only possible manner the face of the number plate 3 and the face of the dial casing 18 will be flush, and the arrows such as 32, on the cover plate of dial casing 18 directly below each finger hole, will be pointing in the direction of the corresponding number and letters, such as 30 and 29 respectively, on the number plate 3** (Fig. 1).

Dial mounting plate 10 is now put over the protruding dust cover 11 with projections 40 facing upward as viewed in Fig. 5 and with the opening in plate 10 encircling the periphery of the dust cover 11. The dial mounting plate 10 has three holes in alignment with holes 21 of the number plate 3 and threaded holes 23 of the dial casing 18 through which the screws 22 extend for assembling the casing 18, the number plate 3, and mounting plate 10 as a completed dial assembly unit. When in this mentioned position, the mounting plate 10 will engage both the rear surfaces of the flange 19 and the dial casing 18 (Fig. 7) whereby the screws 22 will be inserted through the three holes in mounting plate 10, through the holes 21 of the number plate 3, and into the threaded holes 23 of the dial casing 18 and tightly screwed in. One of the projections 40 of plate 10 and its relative position with regards to its mounting bracket 9 is shown in Fig. 7.

The plate mounting brackets 9 are fastened to the base plate 2 by means of screws 20 through the hole 37 of the projections 14 and into the threaded holes in the base plate 2. Bracket plate 12 is fastened to the base plate 2 by means of screw 27 extending through a hole in base 2 and through the threaded hole 38 of the projection 36 of center leg **12*a* as shown in Fig. 7. The mounting brackets 9 and bracket plate 12 are fastened together by screws 35 through the holes on the bracket plate 12 and through threaded holes on the bracket elbows 34 of the mounting brackets 9** (Fig. 2 and 7).

The dial mounting plate with the number plate 3 and the dial casing 18 secured thereto is lowered by way of the openings in the bayonet slots 26 over the stud 16, with the projections 40 overlapping the mounting brackets 9, as shown in Fig. 7. Plate 10 is lowered until the ends of the bow springs 13 make contact with mounting plate 10 and until the openings of the bayonet slots 26 are opposite the stud 16. At this point, simultaneous downward pressure is applied to the dial assembly, and a movement toward leg 12*a* is applied, to cause dial plate 10 to force the bow springs 13 to spread and tension, and allow the humps of bayonet slots 26 to go under the studs 16. The pressure is then released to cause the tension in the bowed springs 10 to force the dial assembly upward, and force the grooved portion of the bayonet slots 26 to engage the studs 16. The dial assembly is now movably and resiliently mounted on the mounting brackets which are mounted on the base.

A telephone housing 1 is now lowered over the dial mounting assembly. The housing 1 has a circular dial opening therein for positioning the dial assembly. The housing 1 has a front surface portion 5, and a circular housing flange 6 below the front surface portion 6 upon which a tapered portion of the rim 19*c* of the number plate 3 is seated. The housing is now pressed down causing the housing flange 6 to engage the tapered periphery rim 19*c* of the number plate 3, the flange 6 and tapered rim 19*c* being engaged and causing the dial assembly to be pushed down against the tension of the bow springs 13. Due to tolerances in manufacturing, the tapered portion of rim 19*c* and flange 7 permits the housing flange 6 to engage this rim 19*c* and flange 7 somewhere along the tapered portion to insure dust proofing the internal mechanism of the housing 1. While the downward pressure is applied to the housing 1, the housing 1 is fastened to the base plate 2 in any well-known manner such as being screwed together. With the housing 1 fastened to the base plate 2, the studs 16 are somewhere within the wide elongated grooves of the bayonet slots 26 and the bow springs 13 resiliently act against the base plate 10 to hold a certain spot on the dial assembly tapered flange 7 of the number plate 3 against the housing flange 6 causing the front surface portion 5 of the housing to be approximately flush with the face of the number plate 3 (Fig. 7).

The reason for resiliently mounting the dial assembly by means of bow springs 13 is to also overcome manufacturing tolerances in the making of the housing and the inner parts of the subset. In mass production of these parts, it is necessary to allow these parts to have slightly different dimensions, commonly referred to as tolerances, and therefore if certain of the parts are assembled with the maximum, or minimum tolerances, the overall height of the dial assembly mounted on its base would be too high to allow the housing to be secured to the base, or the height of the dial assembly would be too low to permit the tapered portion of rim 19*c* to properly seat on the housing flange 6. Another example might be that one of the bracket legs 12*a* was slightly smaller than its mate and therefore, the dial assembly would tend to lean to that one side and the number plate 3 would not be approximately flush with the front housing surface 5. However, due to the resiliency of the bow springs 13, these manufacturing tolerances are overcome to always enable the tapered portion of rim 19*c* to properly seat on flange 6 and to always position number plate 3 approximately flush with the front housing surface 5.

While one embodiment of the invention has been disclosed, it will be understood that various modifications may be made therein which are within the true spirit and scope of the invention.

What is claimed is:

1. A telephone subset comprising a base, a casing secured to said base, a dial mounting bracket secured to said base within said casing, a dial assembly, a circular number plate encircling said dial assembly, a tapered rim on the outer periphery of said number plate, a circular dial opening in said casing encircling said dial assembly, a dial mounting plate secured to said dial assembly, studs fastened to said mounting bracket and bayonet slots in said dial mounting plate for hooking on said studs for movably securing said dial assembly to said mounting bracket, spring means secured to said mounting bracket and adapted to engage said dial mounting plate and to forcibly hold a certain portion of the tapered rim, depending upon dimensional variations in manufacture, in engagement with said casing opening, said tapered portion of said rim self-aligning said dial assembly within said casing opening responsive to the tensioning of said spring means against said dial mounting plate to approximately make the outer surfaces of the number plate and casing flush with each other.

2. A telephone subset comprising a base, a casing, a dial mounting bracket secured to said base within said casing, a dial assembly, a number plate encircling said dial assembly, a circular dial opening in said casing for encircling said number plate, a dial mounting plate secured to said dial assembly, studs fastened to said mounting bracket, bayonet slots in said mounting plate comprising an opening for accepting said studs and a hump and groove, said hump and groove of said bayonet slots co-operating with said studs to permit limited movement of said dial assembly with respect to said dial mounting bracket, a tapered portion on the rim of the outer periphery of said number plate, spring means secured to said mounting bracket and adapted to engage said dial mounting plate and tensioned to forcibly hold said dial assembly in engagement with said casing, the tapered portion of said rim of said number plate responsive to the tensioning by said springs for self-aligning said number plate within said opening of said casing.

3. A telephone subset comprising, a base, a casing, a dial mounting bracket secured to said base, a dial assembly, a number plate for encircling said dial assembly, a circular dial opening in said casing for encircling said number plate, a dial mounting plate secured to said dial assembly, studs fastened to said mounting bracket, bayonet slots in said mounting plate consisting of a hump and groove, spring means secured to said mounting bracket engaged by said mounting plate, said humps of said bayonet slots going under said studs and tensioning said spring means responsive to manual pressure applied to said mounting plate, said studs being aligned with said grooves of said bayonet slots responsive to simultaneous movement of said mounting plate, said studs engaging said grooves of said bayonet slots for resiliently seating said dial assembly responsive to the cessation of said manual pressure and movement, a tapered rim on the outer periphery of said number plate, said spring means and bayonet mounting and said tapered rim responsive to fastening said casing to said base for self-aligning and tensioning said dial assembly within said dial opening to provide a dust seal for the internal mechanism of said subset.

4. A telephone subset comprising a base, a casing secured to said base, a dial mounting bracket secured to said base within said casing, a dial assembly, a circular dial opening in said casing encircling said dial assembly, a circular flange on said casing adjacent said opening, a circular flange on the periphery of said dial assembly including a tapered portion, a dial mounting plate secured to said dial assembly, a pair of studs fastened to said mounting bracket and bayonet slots in said dial mounting plate for hooking on said studs for movably securing said dial assembly to said mounting bracket, and spring means secured to said mounting bracket and adapted to engage said dial mounting plate and to forcibly hold said dial assembly tapered flange in engagement with said casing flange, the tapered portion of said dial assembly flange moving the dial assembly and mounting bracket into alignment with the circular dial opening in said casing to prevent side motion of said dial assembly.

5. A telephone subset comprising a base, a casing secured to said base, a dial mounting bracket secured to said base within said casing, a dial assembly, a circular dial opening in said casing encircling said dial assembly, a circular flange on said casing adjacent said opening, a circular tapered rim on the periphery of said dial assembly, a dial mounting plate secured to said dial assembly, said dial mounting plate having right angled projections, a bayonet slot on each projection of said dial mounting plate, studs fastened to said mounting bracket for hooking said bayonet slots thereon and locking said projections of said dial plate over said mounting bracket for preventing movement of said dial assembly in one direction and for movably securing said dial assembly in a second direction, spring means secured to said mounting bracket and adapted to engage said dial mounting plate to forcibly hold a portion of said tapered rim in engagement with said casing flange, the tapered portion of said rim self-aligning said dial assembly within casing opening in said second direction responsive to the tensioning of said spring means against said dial mounting plate.

6. A telephone subset comprising a base, a casing, a dial mounting bracket secured to said base, a dial assembly, a circular number plate encircling said dial assembly, a circular dial opening in said casing encircling said number plate, a tapered rim about the periphery of said number plate having different diametrical dimensioned portions, a dial mounting plate secured to said dial assembly, studs fastened to said mounting bracket and bayonet slots in said mounting plate for hooking on said studs for movably securing said dial assembly to said mounting bracket, spring means secured to said mounting bracket and adapted to engage said dial mounting plate and to forcibly hold one of the diametrical dimensioned portions of said number plate rim in engagement with said casing flange depending upon the dimensional variations in manufacturing between the housing flange and the tapered rim of said number plate, and regardless of the diametrical dimensioned portion of said number plate rim engaging said casing flange the dial assembly will be self-aligned within said casing opening to provide a dust seal for the internal mechanism of said subset.

7. A telephone subset comprising a base, a casing, a dial mounting bracket secured to said base, a dial assembly, a circular number plate encircling said dial assembly, a rim in the form of a truncated cone about the periphery of said number plate having different diametrical dimensioned portions, a dial mounting plate secured to said dial assembly including projections at right angles thereto, studs fastened to said mounting bracket, bayonet slots in said mounting plate projections for hooking on said studs and locking said mounting plate projections over said mounting bracket to prevent movement of said dial assembly in one direction and permit limited movement in a second direction, spring means secured to said mounting bracket and adapted to engage said dial mounting plate and to forcibly hold one of the diametrical dimensioned portions of said truncated cone rim in engagement with said casing flange depending upon the dimensional variations in manufacturing between the housing flange and said rim of said number plate, and regardless of the diametrical dimensioned portion of said truncated rim engaging said casing flange the dial assembly will be self-aligned in said second direction within said casing opening to provide a dust seal for the internal mechanism of said subset.

No references cited.